US005751534A

United States Patent [19]

DeBalko

[11] Patent Number: 5,751,534

[45] Date of Patent: May 12, 1998

[54] COAXIAL CABLE SURGE PROTECTOR

[75] Inventor: George Andrew DeBalko, Township of Washington, Morris County, N.J.

[73] Assignee: Lucent Technologies Inc., Murray Hill, N.J.

[21] Appl. No.: 655,069

[22] Filed: May 29, 1996

[51] Int. Cl.$^{6}$ .......... H02H 9/06

[52] U.S. Cl. .......... 361/119; 361/56; 361/58; 361/111

[58] Field of Search .......... 361/56, 111, 119, 361/58, 113

[56] References Cited

U.S. PATENT DOCUMENTS

| | | | |
|---|---|---|---|
| 4,099,217 | 7/1978 | Fitchew | 361/56 |
| 4,987,391 | 1/1991 | Kusiak, Jr. | 361/111 |
| 5,299,088 | 3/1994 | Honl et al. | 361/119 |
| 5,566,056 | 10/1996 | Chaudhry | 361/117 |

*Primary Examiner*—Jeffrey A. Gaffin
*Assistant Examiner*—Michael J. Sherry
*Attorney, Agent, or Firm*—Lester H. Birnbaum

[57] ABSTRACT

The invention is a surge protector which can provide voltage and current protection in coaxial cable systems. The protector includes a central conductor which is coupled in series with a variable resistance, and a voltage surge arrestor which is coupled between the conductor and the housing of the protector. A capacitor may also be coupled in parallel with the resistor. The protector provides both an ac and dc signal path.

8 Claims, 1 Drawing Sheet

COAXIAL CABLE SURGE PROTECTOR

FIELD OF THE INVENTION

This invention relates to devices for protecting coaxial cable systems from excessive voltage and current.

BACKGROUND OF THE INVENTION

Coaxial cable connection has become increasingly important not only for cable TV systems, but also for proposed hybrid fiber coax systems which will combine telephony and broadband transmission in a single network. In such systems, it is vitally important to protect the equipment, the customers, and craftspeople from high voltages and currents which may be caused, for example, by lightning strikes or short circuit conditions. It has been previously suggested that a gas tube be used to connect the center electrode to ground in the event of a voltage surge and that resistors be used to dissipate static charges. (See, for example, U.S. Pat. No. 4,987,391 issued to Kusiak, Jr.) However, such proposals, in general, do not provide for excess current protection. Further, in broadband and satellite systems, it is important to allow transmission of a dc as well as ac signal while still maintaining appropriate voltage and current protection.

SUMMARY OF THE INVENTION

The invention is a device which is connectable to a coaxial cable having a center conductor and an outer sheath. The device includes a housing which surrounds a conductor. The conductor extends to at least one end of the housing so that the conductor is connectable to the center conductor of the coaxial cable while the housing is connectable to the outer sheath. A voltage surge arrestor is coupled between the conductor and the housing. A variable resistor is coupled in series with the conductor within the housing. A capacitor may be coupled in parallel with the variable resistor. A sealing gel can also be used inside the housing to make the unit work in a moisture environment.

BRIEF DESCRIPTION OF THE FIGURES

These and other features of the invention are delineated in detail in the following description. In the drawing:

The FIGURE is a cross sectional view, partly schematic, of a device in accordance with an embodiment of the invention.

DETAILED DESCRIPTION

Figure 1:
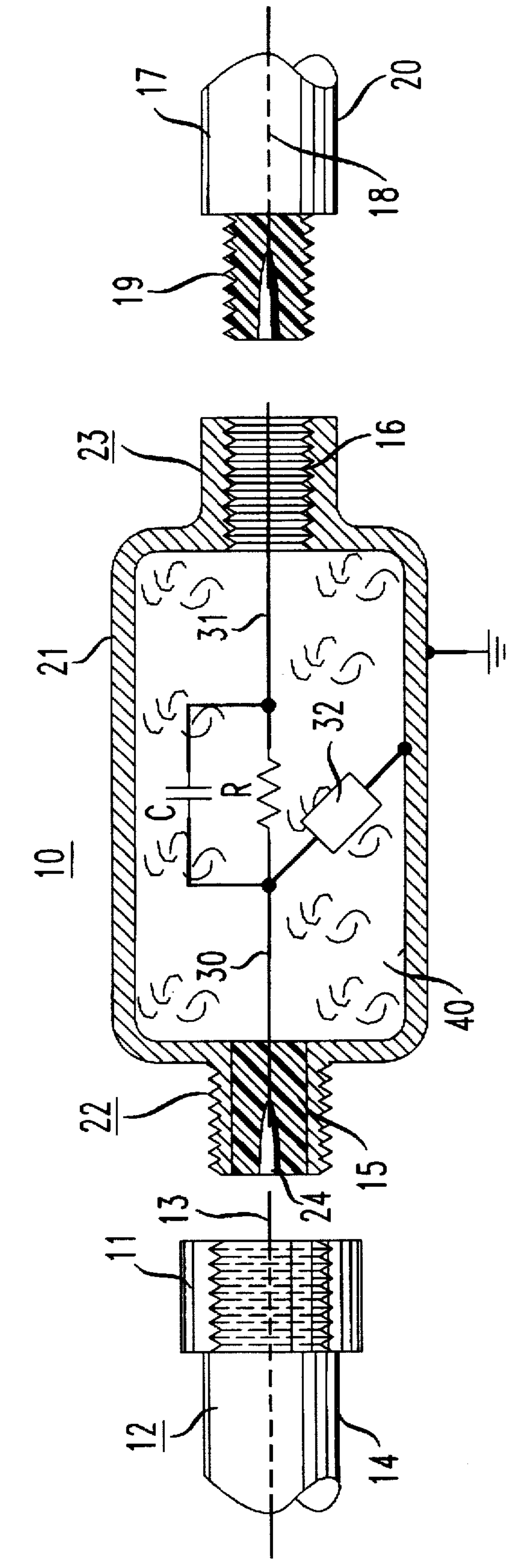

FIG. 1 illustrates an embodiment of the invention. The device, 10, is typically connected to a first coaxial cable, 12, which includes a center conductor, 13, surrounded by a grounded sheath, 14. The device, 10, is coupled to the cable, 12, at one end, 15, of the device through a standard connector, 11, which in this example is a male connector. The other end, 16, of the device, 10, is coupled to a second coaxial cable, 17, which also includes a center conductor, 18, surrounded by a grounded sheath, 20. In this example, the end, 16, is coupled to the cable, 17, through a standard female coaxial cable connector, 19.

The device, 10, includes a housing, 21, which is made of a conductive material such as Aluminum. The housing is cylindrical with a wider middle section and narrowed ends, 15 and 16. The housing, 21, should be grounded for example, by connection to the ground bus (not shown) of a network interface device by means of a bracket (not shown). The ends, 15 and 16, are appropriately sized and include F type coaxial terminations, 22 and 23, on their outer and inner surfaces respectively to permit attachment of the connectors, 11 and 19, thereto. The end, 15, also includes an aperture, 24, therein to receive the center conductor, 13, therein. The middle section is typically hollow, while the ends, 15 and 16, are solid except for the appropriate apertures and center conductor.

Extending from the aperture, 24, is a first conductor, 30, which is typically a standard solid wire. The conductor is positioned within the end 15, so as to make electrical connection to the center conductor, 13, of the cable, 12, when the connector, 11, is attached to the end. The conductor, 30, extends into the middle section essentially along the axis of the cylinder defined by the housing, 21. The conductor is coupled to one end of a resistor, R, which has the property of increasing its resistance when the current therethrough goes above a certain threshold. Such resistors are typically referred to as Positive Temperature Coefficient (PTC) resistors and are commercially available. In a typical application, it is desired that the resistor have an initial resistance of (1–4) ohms and a threshold of at least 150 milliamps, after which the resistance increases at a high rate typically resulting in resistances of 10,000 ohms. The other end of the resistor, R, is coupled to a second conductor, 31, which extends to and through the opposite end, 16. The conductor, 31, is positioned in the end, 16, so as to make contact with the center conductor, 18, of coaxial cable, 17, when connector, 19, is screwed onto that end.

Also coupled to the conductor, 30, is one end of a voltage surge arrestor, 32. The other end of the surge arrestor is coupled to the housing, 21. The surge arrestor can be any of the standard types which are non-conductive until the voltage applied thereto exceeds a threshold value, at which time the arrestor conducts the signal applied to the conductor to the housing which is grounded. Preferably, the arrestor is a gas tube with a threshold of 150–200 volts but also may be of the solid state or carbon block type. As known in the art, a gas tube comprises at least two electrodes and a gas therebetween which ionizes, and therefore conducts, when the threshold voltage is exceeded. Once the high voltage is removed, the arrestor returns to its normal non-conductive state.

One plate of a capacitor, C, is also coupled to the conductor, 30. The other plate of the capacitor, C, is coupled to the conductor, 31, so that the capacitor is coupled in parallel with the resistor, R. Preferably, the capacitor, C, has a capacitance within the range 10 to 1000 pf., so that the capacitor can pass the high frequency signals (i.e., above 5 MH) which would normally be attenuated by the resistor, R.

A non-conductive sealing gel, 40, can be included in the housing, 21, so that moisture ingression would be minimized for outdoor applications.

In operation, the device, 10, would normally be mounted within a network interface device on the outside of a customer's premises and would connect a drop cable, 12, to a jumper cable, 17, which would extend into the premises. During normal operation, the device would conduct the incoming signals on the center conductor, 13, of the drop cable through the conductors, 30 and 31, to the center conductor 18, of the jumper cable. The housing, 21, of the device would be grounded as a result of the housing being connected to the ground bus in the network interface device and connectors 11 and 19 being mounted on the ends and carrying the ground signal from the sheath, 14, of the drop cable, 12, to the sheath, 20, of the jumper cable, 17. If a voltage exceeding the threshold voltage of the arrestor, 32, were to appear on the center conductor, 30, that voltage would be directed to the grounded housing, 21. If a current exceeding the threshold of the PTC resistor, R, were to appear on conductor 30, that current would be attenuated by the increasing resistance of the resistor.

It is important to note that the device, 10, provides both voltage and current protection while always maintaining a path for ac signals to pass through the device, i.e., through conductors 30 and 31 and capacitor, C. Further, during normal operation, there will be a path for dc signals through resistor, R.

What is claimed is:

1. A device which is connectable to a coaxial cable having a center conductor and an outer sheath, said device comprising:

a housing;

a conductor surrounded by the housing, said conductor extending to at least one end of the housing so that the conductor is connectable to the center conductor of the cable while the housing is connectable to the outer sheath;

a voltage surge arrestor coupled between the conductor and the housing; and a variable resistor coupled in series with the conductor within the housing such that the conductor and resistor provide an electrical path for dc signals through the device.

2. The device according to claim 1 wherein the voltage surge arrestor is a gas tube.

3. The device according to claim 2 wherein the gas tube has a threshold of 150 to 200 volts.

4. The device according to claim 1 wherein the resistor is a positive temperature coefficient resistor.

5. The device according to claim 4 wherein the resistor has a current threshold of at least 150 milliamps.

6. The device according to claim 1 further comprising a capacitor coupled in parallel with the resistor so as to provide a low impedance path for ac signals.

7. The device according to claim 1 wherein the housing includes two opposite ends, each capable of receiving a coaxial connector mounted to a coaxial cable.

8. The device according to claim 1 wherein the housing is filled with non conductive gel.

* * * * *